(12) United States Patent
Marsolek et al.

(10) Patent No.: US 11,408,134 B2
(45) Date of Patent: Aug. 9, 2022

(54) PAVING OPERATION CONTROL METHOD AND SYSTEM

(71) Applicant: Caterpillar Paving Products Inc., Brooklyn Park, MN (US)

(72) Inventors: John L. Marsolek, Watertown, MN (US); Jacob J. McAlpine, Otsego, MN (US); Joshua D. Keyes, Saint Michael, MN (US); Corey B. Hanback, Lakeville, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 292 days.

(21) Appl. No.: 16/852,666

(22) Filed: Apr. 20, 2020

(65) Prior Publication Data

US 2021/0324587 A1    Oct. 21, 2021

(51) Int. Cl.
*E01C 19/23* (2006.01)
*G01J 5/00* (2022.01)

(52) U.S. Cl.
CPC ............ *E01C 19/23* (2013.01); *G01J 5/0025* (2013.01)

(58) Field of Classification Search
CPC .............................. E01C 19/23; G01J 5/0025
USPC ........................................................ 404/75
See application file for complete search history.

(56) References Cited

U.S. PATENT DOCUMENTS

| 8,099,218 | B2 | 1/2012 | Glee et al. |
| 9,476,168 | B2 | 10/2016 | Oetken et al. |
| 9,540,778 | B2 | 1/2017 | Rutz et al. |
| 10,228,293 | B2 | 3/2019 | Marsolek |
| 10,482,330 | B2 * | 11/2019 | Buschmann .......... G01J 5/0859 |
| 10,655,283 | B2 * | 5/2020 | Andersson ............. G01N 33/42 |
| 2019/0106846 | A1 | 4/2019 | Marsolek et al. |

FOREIGN PATENT DOCUMENTS

WO    WO 00/70150 A1    11/2000

* cited by examiner

*Primary Examiner* — Tu-Tu V Ho
(74) *Attorney, Agent, or Firm* — Bookoff McAndrews PLLC

(57) ABSTRACT

In one aspect, a method of controlling an operation of a compactor during a paving operation may include obtaining thermal image data and position data of an asphalt mat using a measuring device on a paving machine, and determining, using a controller, whether a person is on the asphalt mat based on a temperature range and the thermal image data. The method also includes determining, using the controller, a distance between the person and the compactor using the obtained position data and a position of the compactor, and generating, using the controller, a signal for reducing a speed of the compactor when the determined distance between the person and the compactor is less than a maintain speed threshold distance. In other aspects, a related system is provided for controlling a compactor during a paving operation.

20 Claims, 5 Drawing Sheets

PAVING OPERATION CONTROL METHOD AND SYSTEM

TECHNICAL FIELD

The present disclosure relates generally to a method and system used during a paving operation, and more particularly, to a method and system for controlling a compactor during a paving operation.

BACKGROUND

During a paving operation, a number of machines simultaneously move across a work area to form an asphalt mat. For example, a paving system may include a haul truck that delivers paving material, a paving machine that distributes the paving material on the work area, and one or more compactors or rollers that compact and smooth the distributed paving material. The haul truck, the paving machine, and the one or more compactors may travel at a set distance relative to each other to ensure that the paving material is distributed and compacted at an optimal temperature. To that end, the paving machine may be equipped with a temperature measuring device that measures a temperature of a plurality of points on the asphalt mat to control movement of the machines and to assess quality of the asphalt mat.

For example, a system described in U.S. Pat. No. 8,099,218 B2 includes an electronic control unit that uses sensed paving material temperatures and machine positions to determine whether compacting machines are about to compact paving material that is in a tender zone. A tender zone is an area of paving material at a temperature that makes the material prone to shoving and creating a wave in front of a compactor drum. The '218 patent discloses an electronic control unit that establishes a plan for paving a work area based on a positional temperature model, compares temperature data received from temperature sensors with a predicted temperature from the positional temperature model, and, if the temperatures differ from each other, updates the positional temperature model to change the plan, and operates the system in accordance with the updated plan by outputting appropriate machine navigation signals. In one embodiment, signals are transmitted to machines to adjust a relative spacing therebetween, to avoid compacting an area of the mat that is within a predefined temperature range, such as the tender zone, or to ensure that a particular area of the mat is compacted while the mat is in a predefined temperature range. That is, the system described in the '218 patent operates in accordance with an updated plan by outputting signals to control machine navigation based on a comparison between a predicted temperature and a sensed temperature in order to ensure compaction of a mat within a desired temperature range.

The system described in the '218 patent does not, however, provide for processing thermal image data and controlling machines based on an indication that a person is present on the mat during a paving operation.

The paving operation control method and system according to the present disclosure may solve one or more of the problems set forth above and/or other problems in the art. The scope of the current disclosure, however, is defined by the attached claims, and not by the ability to solve any specific problem.

SUMMARY

In one aspect, a method of controlling an operation of a compactor during a paving operation may include obtaining thermal image data and position data of an asphalt mat using a measuring device on a paving machine, and determining, using a controller, whether a person is on the asphalt mat based on a temperature range and the thermal image data. The method also includes determining, using the controller, a distance between the person and the compactor using the obtained position data and a position of the compactor, and generating, using the controller, a signal for reducing a speed of the compactor when the determined distance between the person and the compactor is less than a maintain speed threshold distance.

In another aspect, a system for controlling a paving operation may include a paving machine having a measuring device configured to obtain thermal image data and position data of an asphalt mat, and a paving machine controller configured to determine whether a person is on the asphalt mat based on a temperature range and the thermal image data. The system may also include a compactor including a compactor controller in communication with the paving machine controller. The paving machine controller is further configured to determine, when the paving machine controller determines that a person is on the asphalt mat, a distance between the person and the compactor based on the obtained position data. In addition, the paving machine controller is configured to generate and output a signal for reducing a speed of the compactor when the determined distance between the person and the compactor is less than a maintain speed threshold distance. Further, the compactor controller is configured to automatically reduce the speed of the compactor upon receiving the signal to reduce the speed of the compactor.

Still further, a method of automatically reducing a speed of a compactor during a paving operation upon detection of a person on an asphalt mat may include receiving, from a measuring device on a paving machine, near real-time temperature data and near real-time position data for a plurality of points of an asphalt mat, and determining, using a controller on the paving machine, points, of the plurality of points, for which a temperature value is within a temperature range as person-identifier-points, based on the received near real-time temperature data. In addition, the method may include generating a signal, upon determining the person-identifier-points, to reduce the speed of the compactor.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion, such that a process, method, article, or apparatus that comprises a list of elements does not include only those elements, but may include other elements not expressly listed or inherent to such a process, method, article, or apparatus. Moreover, in this disclosure, relative terms, such as, for example, "about," "generally, "substantially," and "approximately" are used to indicate a possible variation of ±10% in the stated value. In addition, in this disclosure, the term "automatically" is used to indicate that the function is performed within a device, e.g., a controller, without action on the part of an operator.

Figure 1:
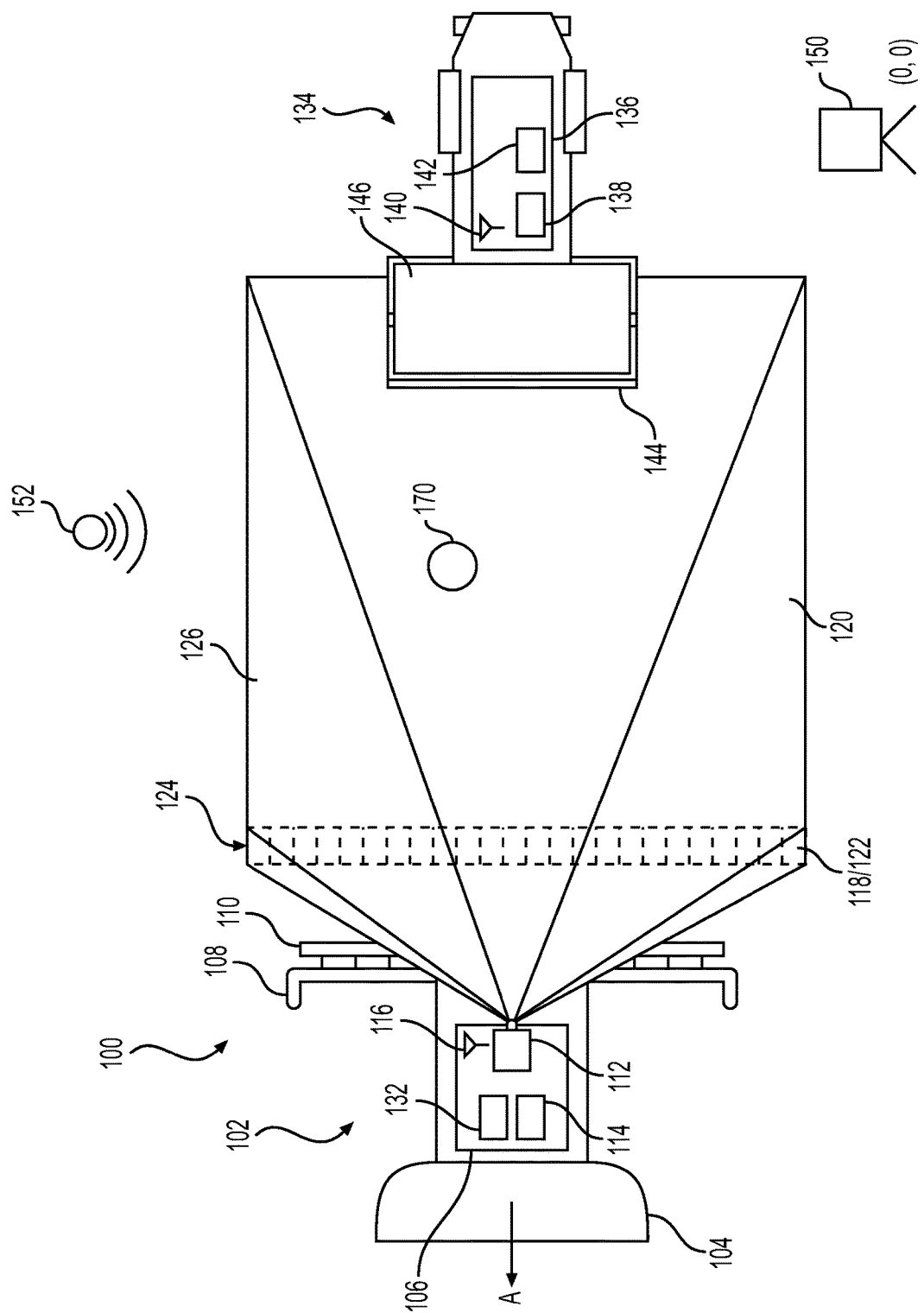
FIG. 1 shows a schematic diagram of a paving system, including a paving device and a compactor, in accordance with the present disclosure.

Referring to FIG. 1, a paving system 100 used in a paving operation includes a paving device, or a paver 102 that may include a hopper 104, a paver platform 106, at least one auger 108, a screed 110, a thermal measuring device 112, a paver controller 114, and a paver Global Positioning System (GPS) device 116. The paver 102 may be any conventional paving device or machine. The thermal measuring device 112 may be an optical temperature sensor, such as a thermal camera or a thermal line scanner, that uses infrared radiation to capture the thermal image data 118. The thermal measuring device 112 has a field of view (FOV) 120, and is shown mounted on the paver platform 106 in an orientation in which the thermal measuring device 112 is configured to capture thermal image data 118 for each data point 122 along each scan line 124 of an asphalt mat 126 deposited on a work surface located behind the screed 110, as the paver 102 progresses. That is, as the paver 102 progresses along a work surface in the direction shown by arrow A in FIG. 1, the thermal measuring device 112 faces in an opposite direction relative to arrow A, and captures thermal image data 118. The thermal image data 118 may include pixel values or coordinate values (x,y), and temperature values $T_{x,y}$, for each of a plurality of data points 122 along a scan line 124, for each of a plurality of scan lines 124, to generate a full thermal map 128 of the asphalt mat 126, shown in FIG. 2. The thermal measuring device 112 may capture the thermal image data 118 in near real-time. The present disclosure is not, however, limited to such an arrangement of the thermal measuring device 104, and the thermal measuring device 112 may be mounted to other parts of the paver 102 or may be held by a user. For example, the thermal measuring device 112 may be mounted to the screed 110.

Figure 2:
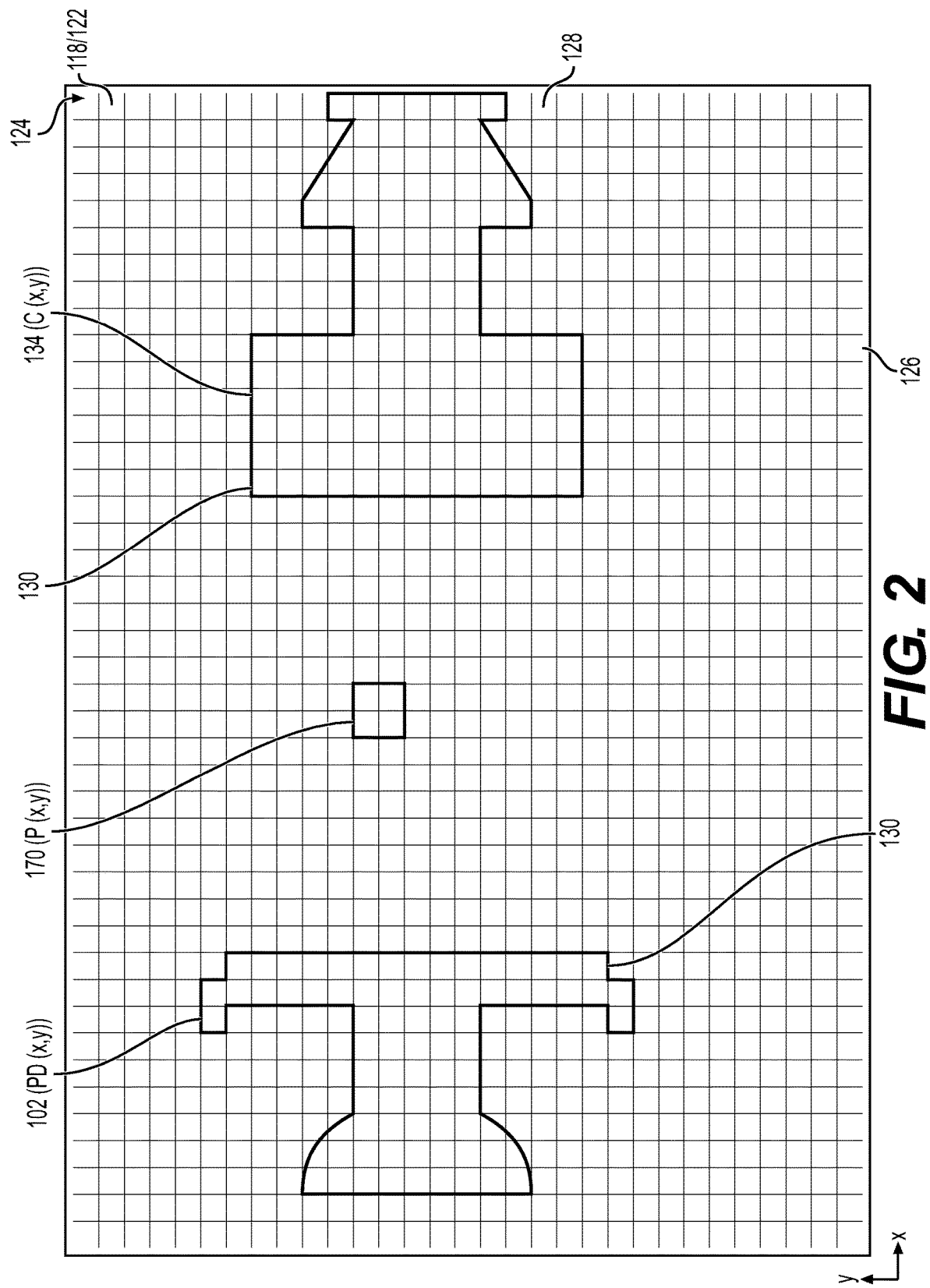
FIG. 2 shows a thermal map of the asphalt mat, including data indicating a person is on the asphalt mat.

The paver GPS device 116 may be any conventional type of GPS device including an antenna that amplifies radio signals transmitted on specific frequencies by GPS satellites, and a receiver that receives the amplified radio signals and converts them into electrical signals, i.e., GPS data 130, shown in FIG. 2, for use by the paving device controller 114. That is, the paver GPS device 116 receives signals from three or more satellites to determine a location of the paver 102, using trilateration. The receiver of the paver GPS device 116 calculates a difference, for each signal received from a satellite, between a time the satellite sends the signal and a time the signal is received by the paver GPS device 116. Using the time and signal information received from the three or more satellites, the receiver triangulates a near real-time position of the paver 102, and can also determine a speed of the paver 102. The GPS device 116 may, however, operate as a part of a total station system, as described below.

The near real-time position of the paver 102 may be defined as a paver coordinate PD(x,y). The paver coordinate PD(x,y) may be, for example, a point on the paver 102 that is closest to the asphalt mat 126. The paver GPS device 116 can also determine a relationship of the near real-time position of the paver 102 to other machines in the paving system 100, and can transmit the near real-time position of the paver 102 to the paver controller 114 or to another device. The paver GPS device 116 may be provided in, on, or associated with the paver 102.

Again referring to FIG. 1, the paver 102 also includes a paver display 132 installed within the paver platform 106, and optionally on the back of the paver 102. The paver display 132 may be connected to the paver controller 114. The paver display 132 may be, for example, a liquid crystal display (LCD) device, that displays notifications, in the form of data, commands, alerts, or other information, to an operator of the paver 102. The paver display 132 may also serve as a user interface to receive input or commands from a user and to output alerts or other notifications to the user.

As shown in FIG. 1, the paving system 100 also includes at least one compactor 134, which may be any conventional compacting device or machine. The compactor 134 has a compactor cab 136, a compactor controller 138, a compactor GPS device 140, and a compactor display 142. The compactor display 142 may be, for example, a liquid crystal display (LCD) device. The compactor 134 may also include a front frame 144 and a cylindrical drum 146 mounted on the front frame 144. The drum 146 may be a single, smooth drum, for example. The compactor 134 may, however, have more than one drum 146. In addition, the compactor 134 may be a pneumatic tired compactor.

Figure 3:
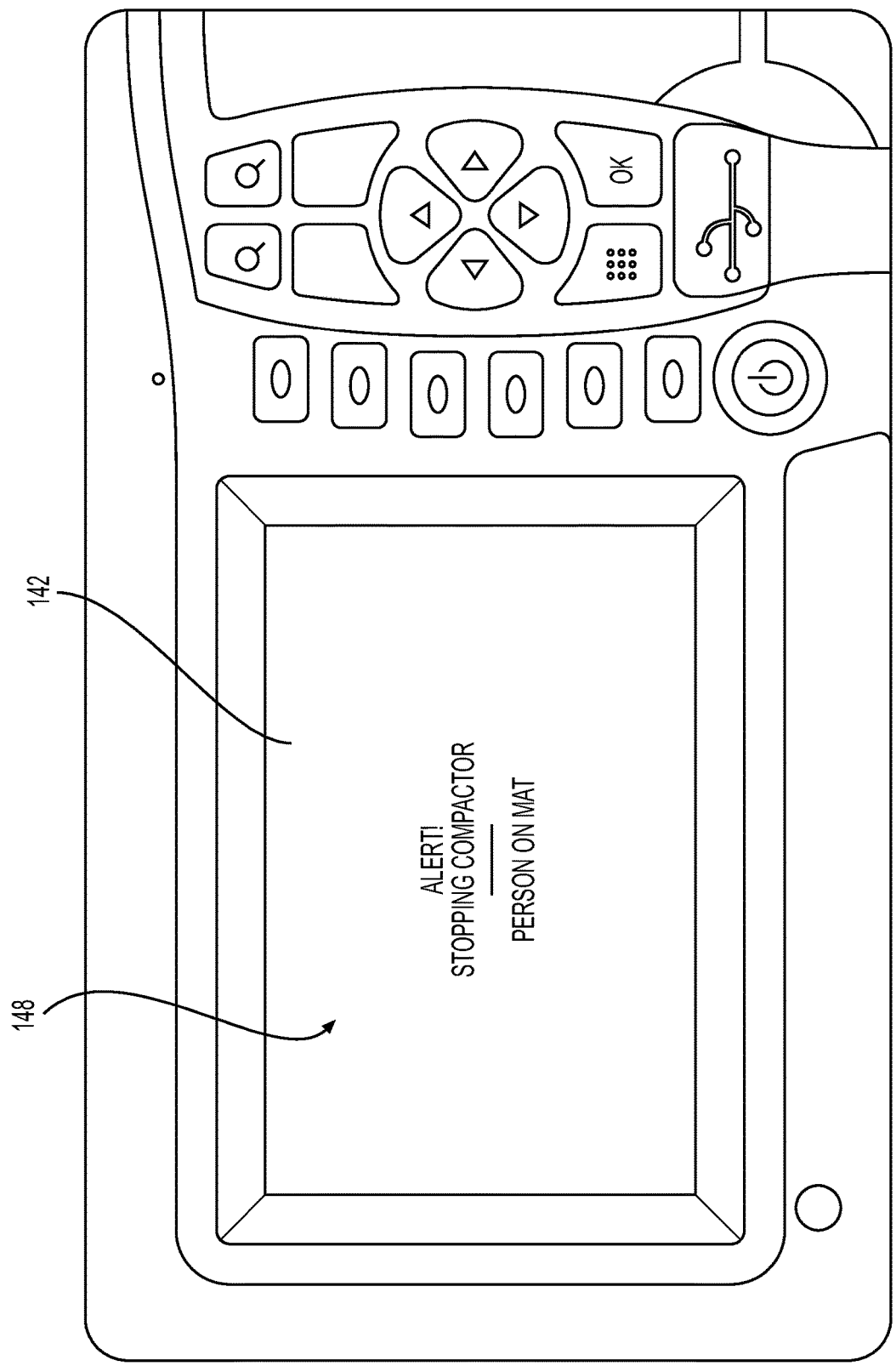
FIG. 3 shows a schematic diagram of a notification of a display of the compactor, in accordance with the present disclosure.

With reference to FIG. 3, the compactor display 142 displays data and notifications 148, including commands and alerts, or other information, to an operator of the compactor 136, and may receive user inputs. Similarly to the paver GPS device 116, the compactor GPS device 140 may be any conventional type of GPS device including an antenna that amplifies radio signals transmitted on specific frequencies by GPS satellites, and a receiver that receives the amplified radio signals and converts them into electrical signals, i.e., GPS data 130, shown in FIG. 2, for use by the compactor controller 138. That is, the compactor GPS device 140 receives signals from three or more satellites to determine a location of the compactor 134, using trilateration. For each signal received by the compactor GPS device 140, the receiver of the compactor GPS device calculates a difference between a time the satellite sends the signal and a time the signal is received by the compactor GPS device 140. Using the time and signal information received from the three or more satellites, the receiver triangulates a near real-time position of the compactor 134, and can also determine a speed of the compactor 134.

Alternatively, the compactor GPS device 140, as well as the paver GPS device 116, may operate as part of a total station system, such as a virtual references system (VRS), a real-time kinetic (RTK) system, or a satellite-based augmentation system (SBAS). The total station system may include a base station 150 and a satellite 152, shown in FIG. 1. The base station 150 may have coordinates of an origin (0,0), and the satellite 152 may communicate wirelessly with each of the paver GPS device 116, the compactor GPS device 140, and the base station 150, to determine the coordinates of the paver 102 and the compactor 134. Further, the base station 150 may communicate wirelessly with each of the paver GPS device 116 and the compactor GPS device 140, in a case in which the total station system does not require a satellite. Details of determining the coordinates of the paver 102 and the compactor 134 are described below.

The near real-time position of the compactor 134 may be defined as a compactor coordinate C(x,y). The compactor coordinate C(x,y) may be, for example, a point of the compactor 134 that is closest to the paver coordinate PD(x, y). The compactor GPS device 140 can also determine a relationship between the near real-time position of the compactor 134 and other machines in the paving system 100, and can transmit the near real-time position of the compactor 134 to the paver controller 114 or to another device. The compactor GPS device 140 may be provided in, on, or associated with the compactor 134.

Figure 4:
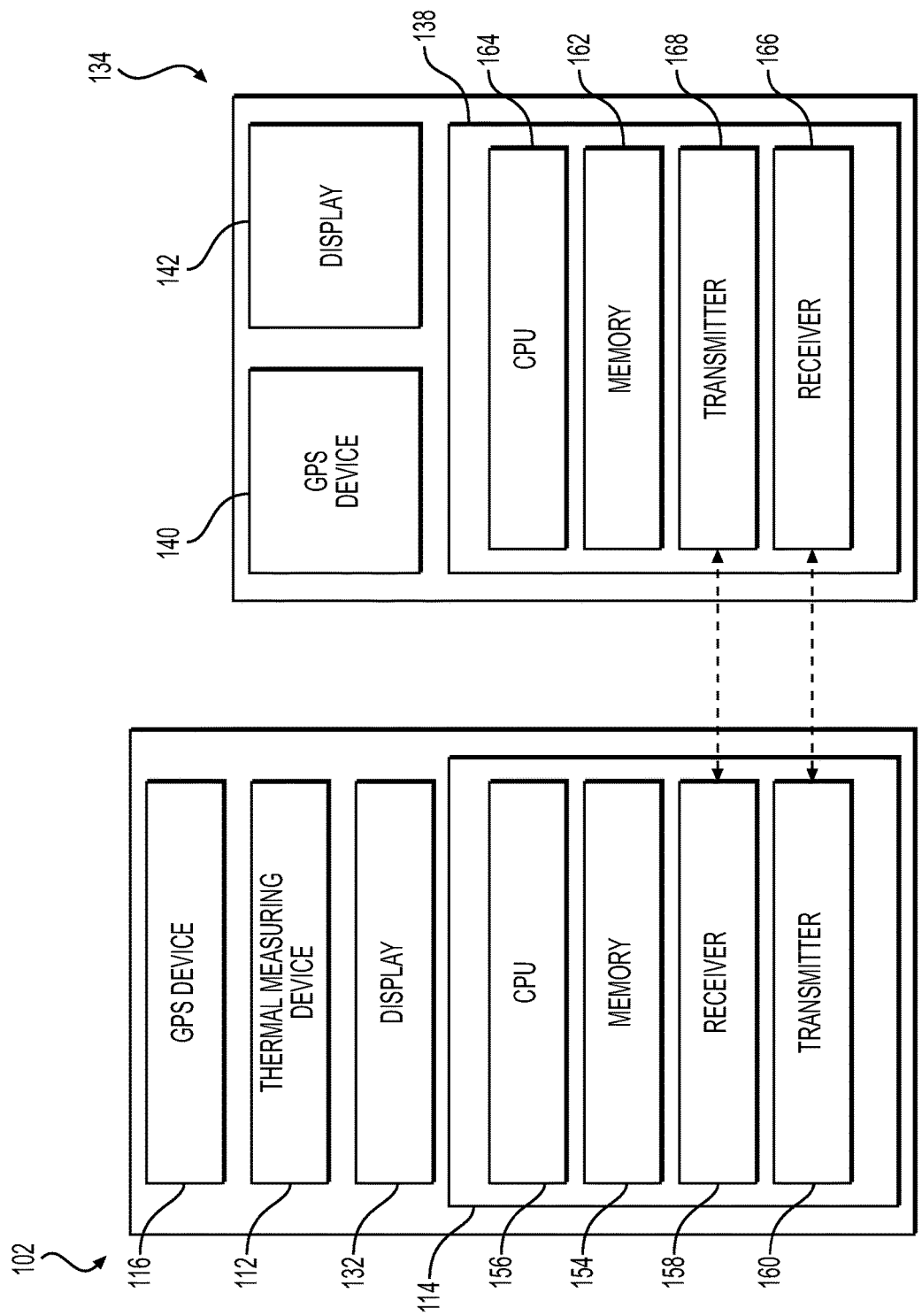
FIG. 4 shows a schematic diagram of a thermal measuring device and a controller of the paving device, and a controller of the compactor, in accordance with the present disclosure.

Referring to FIG. 4, the paver controller 114 may include at least one paver memory 154, at least one paver processor 156, a paver receiver 158, and a paver transmitter 160. The paver memory 154 includes suitable logic, circuitry, interfaces, and/or code that may be configured to store the set of instructions, which are executed by the paver processor 156. In an embodiment, the paver memory 154 may be configured to store one or more programs, routines, or scripts that may be executed in coordination with the paver processor 156 to perform steps of a method, such as method 500 shown in FIG. 5. The paver memory 154 may also store the thermal image data 118, the GPS data 130, and threshold values, including threshold temperatures, which may be used to define a temperature range, and threshold distances, all of which can be used in the method 500. The paver memory 154 may be a Random Access Memory (RAM), a Read-Only Memory (ROM), a Hard Disk Drive (HDD), a storage server, and/or a Secure Digital (SD) card. The paver processor 156 may be a central processing unit (CPU), for example. The paver memory 154 and the paver processor 156 are not, however, limited to the devices listed above.

The paver receiver 158 wirelessly receives signals from other machines in the paving system 100, and/or machines or servers remote to the paving system 100. The paver transmitter 160 wirelessly transmits signals to other machines in the paving system 100 and/or machines or servers remote to the paving system 100. The signals may include the alert commands, navigation commands, the thermal image data 118, and the GPS data 130, for example. The paver receiver 158 and the paver transmitter 160 may be configured to communicate over a Wi-Fi network, or any other suitable wireless network.

The compactor controller 138 may include at least one compactor memory 162, at least one compactor processor 164, a compactor receiver 166, and a compactor transmitter 168. Similarly to the paver memory 154, the compactor memory 162 includes suitable logic, circuitry, interfaces, and/or code that may be configured to store the set of instructions, which are executed by the compactor processor 164. In an embodiment, the compactor memory 162 may be configured to store one or more programs, routines, or scripts that may be executed in coordination with the compactor processor 164 to perform steps of a method, such as the method 500 shown in FIG. 5. The compactor memory 162 may also store the thermal image data 118, the GPS data 130, and threshold values, including threshold temperatures, which may be used to define a temperature range, and threshold distances, all of which may be used in the method 500. The compactor memory 162 may be a Random Access Memory (RAM), a Read-Only Memory (ROM), a Hard Disk Drive (HDD), a storage server, and/or a Secure Digital (SD) card. The compactor processor 164 may be a central processing unit (CPU), for example. The compactor memory 162 and the compactor processor 164 are not, however, limited to the devices listed above.

The compactor receiver 166 wirelessly receives signals from other machines in the paving system 100 and/or machines or servers remote to the paving system 100. The compactor transmitter 168 wirelessly transmits signals to other machines in the paving system 100 and/or machines or servers remote to the paving system 100. The signals may include alert commands, navigation commands, paving material temperature data, and machine position data, for example. The compactor receiver 166 and the compactor transmitter 168 may be configured to communicate over the Wi-Fi network, or any other suitable wireless network.

The paver controller 114 and the compactor controller 138 are configured to control a paving operation by the paving system 100 based at least in part on the thermal image data 118 output from the thermal measuring device 112, the GPS data 130 output from the paver GPS device 116 and the compactor GPS device 140, and the programs executed by the paver processor 150 and by the compactor processor 164. At least one of the paver controller 114 and the compactor controller 138 calculates relative distances between one or both of the paver coordinate PD(x,y) and the compactor coordinate C(x,y), and coordinate values (x,y) of the received thermal image data 118.

For example, the paver GPS device 116 and the compactor GPS device 140 wirelessly communicate the paver coordinate PD(x,y) and the compactor coordinate C(x,y), respectively, within the same local coordinate system, and using the same origin (0,0). In addition, the thermal measuring device 112 is calibrated with respect to the paver 102, such that an offset distance D(x,y) between the paver 102 and a data point 122 included in the thermal image data 118 is known. Using the offset distance D(x,y), each coordinate value (x,y), of the plurality of data points 122 included in the thermal image data 118, can be determined relative to the paver 102. That is, at least one of the paver controller 114 and the compactor controller 138 determines a distance between the coordinate value (x,y) and the paver coordinate value PD(x,y) and/or the compactor C(x,y) using the paver coordinate PD(x,y) or the compactor coordinate C(x,y), respectively, and the offset distance D(x,y): (x,y)=PD(x,y)+D(x,y).

The paver controller 114 and the compactor controller 138 are configured to receive inputs in any appropriate manner, and to provide outputs in any appropriate manner. For example, a user may provide inputs to, and receive outputs from, the paver 102 using the paver display 132. Similarly, a user may provide inputs to, and receive outputs from, the compactor 134 using the compactor display 142. Alternatively, each of the paver 102 and the compactor 134 may have an input device, such as a keyboard, a mouse, a joystick, or a steering wheel, through which a user may provide inputs. Inputs from a user may include user defined values, such as one or more user defined threshold temperatures, and one or more user defined threshold distances. Inputs may also include alert commands and navigation commands. Alternatively, the user may provide inputs and receive outputs remotely, with inputs and outputs being transmitted via one or more of the paver receiver 158, the paver transmitter 160, the compactor receiver 166, and the compactor transmitter 168, as appropriate.

INDUSTRIAL APPLICABILITY

The paving system 100 of the present disclosure, and, in particular, the method executed by the paver controller 114 and the compactor controller 138, may provide for detection of a person 170 on the asphalt mat 126 and automatic control of the compactor 134 to reduce speed or to stop upon detection of the person 170, using the received thermal image data 118 and the GPS data 130. That is, the paving system 100 thus provides automatic controlling the machines of the paving system 100 without requiring specialized equipment.

Figure 5:
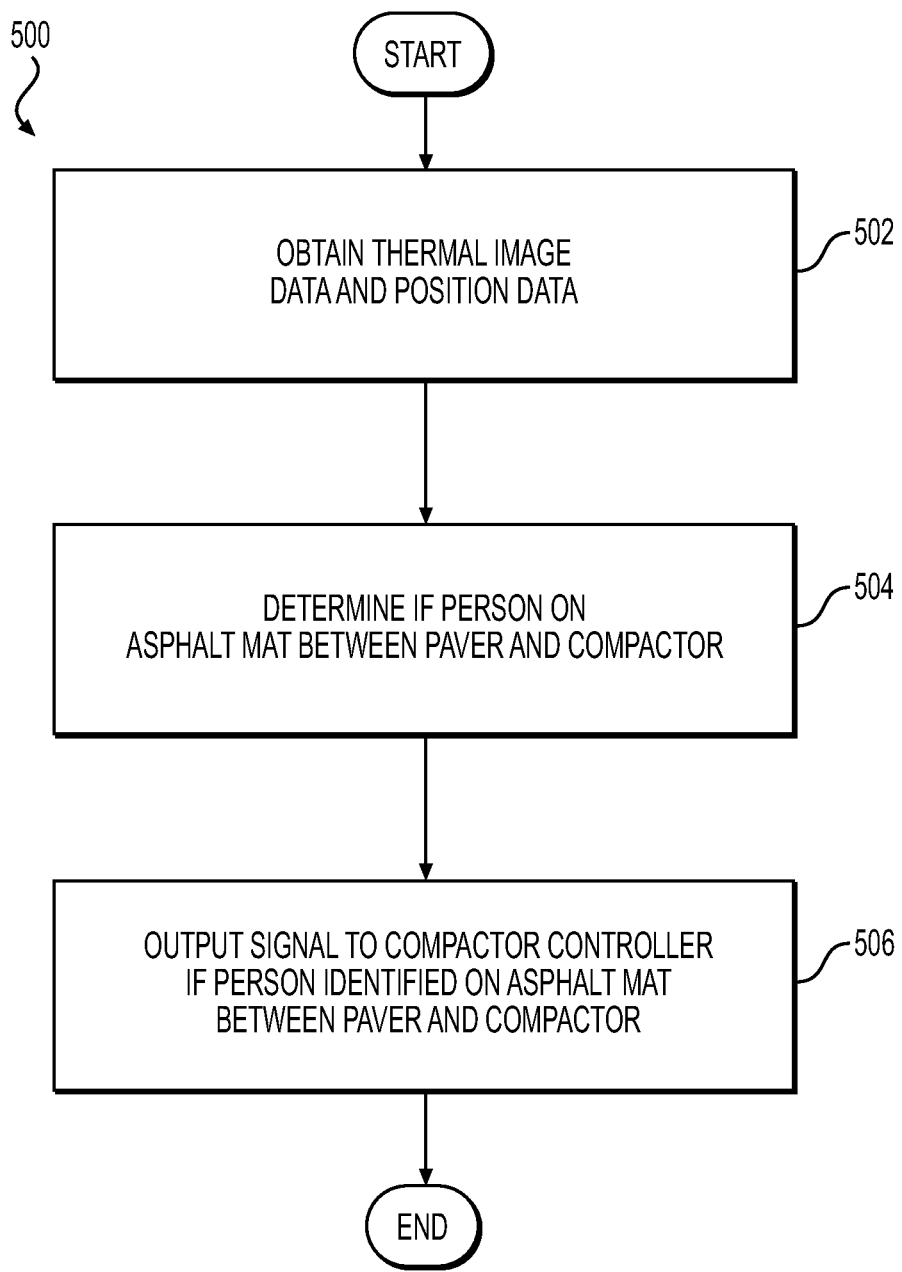
FIG. 5 shows a flowchart of a paving operation control method, in accordance with the present disclosure.

FIG. 5 shows a flowchart for a method 500 executed by the paver controller 114 and the compactor controller 138 using the thermal image data 118 obtained using the thermal measuring device 112, and the GPS data 130 obtained using the paver GPS device 116 and the compactor GPS device 140 of the paving system 100.

In particular, FIG. 5 shows the method 500 of controlling an operation of a compactor 134 based on detection of a person 170 on the asphalt mat 126. For example, in step 502, the paver controller 114 obtains thermal image data 118 of the asphalt mat 126 from the thermal measuring device 112, including the coordinate values (x,y) and the temperature values $T_{x,y}$, for each of a plurality of data points 122 along a scan line 124, for each of a plurality of scan lines 124. The paver controller 114 also obtains the GPS data 130, including the paver coordinate PD(x,y) from the paver GPS device 116 and the compactor coordinate C(x,y) from the compactor GPS device 140.

Next, in step 504, the paver controller 114 determines whether a person 170 is present on the asphalt mat 126 between the paver 102 and the compactor 134 by analyzing the received thermal image data 118. In particular, the paver processor 156 determines whether a temperature value $T_{x,y}$ for each data point 122 of each scan line 124 within the FOV 120 is within a temperature range R, i.e., at or between a low threshold temperature $T_{low}$ and a high threshold temperature $T_{high}$. The low threshold temperature $T_{low}$ and the high threshold temperature $T_{high}$ may be selected based on a temperature profile a human body, so as to exclude temperature values $T_{x,y}$ of, for example, a manhole or a curb. For example, the low threshold temperature $T_{low}$ may be 80° F., and the high threshold temperature $T_{high}$ may be 105° F. In addition, the low threshold temperature $T_{low}$ and the high threshold temperature $T_{high}$ may be further selected based on ambient temperatures, or based on capability information of the thermal measuring device 112. If the paver controller 114 determines that a temperature value $T_{x,y}$ of one or more data points 122 is within the temperature range R, the paver controller 114 may store those data points 122 as person-identifier data points 166, shown in FIG. 2, and thus determines that a person 170 is present on the asphalt mat 126. In addition, the paver controller 114 may identify one of the person-identifier data points 166 as a person coordinate P(x,y). The person coordinate P(x,y) may be a point of the person-identifier data points 166 that is closest to the compactor coordinate C(x,y).

If the paver controller 114 determines that a person is present on the asphalt mat 126 between the paver 102 and the compactor 134, in step 506, the paver controller 114 outputs a signal to the compactor controller 138 to automatically reduce a speed of the compactor 134. Specifically, the paver transmitter 160 outputs the reduce speed signal to the compactor 134. Then, the method 500 ends.

Although the method 500 is described as including steps 502 to 506, the method may include additional steps. For example, in one alternative embodiment, the method 500 may include additional steps in which the compactor receiver 166 receives the reduce speed signal from the paver transmitter 160, and the compactor controller 138 automatically reduces a speed of the compactor 134 by, for example, applying a braking system. The method 500 may also include an additional step of outputting a notification 148, via the compactor display 142, indicating that the speed of the compactor 134 is being automatically reduced because a person 170 has been identified on the asphalt mat 126. As an example, the notification may read "SLOWING COMPACTOR—PERSON ON MAT," as shown in FIG. 3

In addition, in another alternative embodiment, the method 500 may include a step of determining, after the paver controller 114 determines that a person 170 is present on the asphalt mat 126 between the paver 102 and the compactor 134, a relationship between a position of the person 170 and a position of the compactor 134. In particular, the paver controller 114 calculates a compactor-to-person distance $X_{C-P}$ between the compactor coordinate C(x,y) and the person coordinate P(x,y). In a subsequent step, the paver controller 114 compares the compactor-to-person distance $X_{C-P}$ to a maintain speed threshold distance $X_{maintain\_speed}$, to determine whether to maintain a speed of the compactor 134, or to slow the compactor 134. For example, the maintain speed threshold distance $X_{maintain\_speed}$ may be determined based on a stopping capability of the compactor 134, including the weight of the compactor 134 and the speed of the compactor 134, as well as industry standards and guidelines. That is, based on a weight of the compactor 134, which may be over 15,000 lbs., and a speed of the compactor 134, which may be between 3 mph to 8 mph, for example, the maintain speed threshold distance $X_{maintain\_speed}$ may be calculated by the paver controller 114. If the compactor-to-person distance $X_{C-P}$ is less than the maintain speed threshold distance $X_{maintain\_speed}$, the paver controller 114 generates a reduce speed signal. And, as in step 506, described above, the paver controller 114 then instructs the compactor controller 138, via the reduced speed signal, to automatically reduce a speed of the compactor 134. On the other hand, if the compactor-to-person distance $X_{C-P}$ is greater than or equal to the maintain speed threshold distance $X_{maintain\_speed}$, the paver controller 114 does not generate a reduce speed signal. Then, the method 500 ends.

In yet another alternative embodiment, the method may also include a step of determining, after the paver controller 114 determines that compactor-to-person distance $X_{C-P}$ is less than the maintain speed threshold distance $X_{maintain\_speed}$, whether the compactor-to-person distance $X_{C-P}$ is less than a maintain operation threshold distance $X_{maintain\_operation}$, to determine whether to maintain operation of the compactor 134, or to stop the compactor 134. The maintain operation threshold distance $X_{maintain\_operation}$ is less than the maintain speed threshold distance $X_{maintain\_speed}$. The maintain operation threshold distance $X_{maintain\_operation}$ may be determined based on the stopping capability of the compactor 134, including the weight of the compactor 134 and the speed of the compactor 134, as well as industry standards and guidelines. That is, based on the weight of the compactor 134, which may be over 15,000 lbs., and a speed of the compactor 134, which may be between 3 mph and 8 mph for example, the maintain operation threshold distance $X_{maintain\_operation}$ may be calculated by the paver controller 114. If the compactor-to-person distance $X_{C-P}$ is less than the maintain operation threshold distance $X_{maintain\_operation}$, the paver controller 114 generates a stop operation signal. And, similarly to step 506, described above, the paver controller 114 then outputs the signal to the compactor controller 138. In this alternative embodiment, the method 500 may also include the steps of receiving, via the compactor receiver 166, the stop operation signal from the paver controller 114, and automatically stopping the compactor 134 using the compactor controller 138. In addition, in this alternative embodiment, the method 500 may also comprise an additional step of outputting a notification 148 to the compactor display 142 indicating that the compactor 134 is being automatically stopped because a person 170 has been identified on the asphalt mat 126 within the distance $X_{maintain\_operation}$. As an example, the notification 148 may read "STOPPING COMPACTOR—PERSON ON MAT."

Further, although the paver controller 114 performs certain steps of the method 500 in the embodiments described above, in another alternative embodiment, the compactor controller 138 may perform at least some of those steps. For example, in this alternative embodiment, the compactor controller 138 may obtain the thermal image data 118 and the paver coordinate PD(x,y) from the paver controller 114. Then, the compactor controller 138 may determine whether the person 170 is on the asphalt mat 126 by analyzing the received thermal image data 118 using the compactor processor 164. If a person is identified as being present on the asphalt mat 126 between the paver 102 and the compactor 134, the compactor controller 138 may automatically slow or stop the compactor 134, in the same manner as described in the alternative embodiments above. In addition, upon determining that the person 170 is on the asphalt mat 126, the compactor controller 138 may calculate a compactor-to-person distance $X_{C-P}$ and may perform automatic control of the compactor 134 using the maintain speed threshold distance $X_{maintain\_speed}$ and the maintain operation threshold distance $X_{maintain\_operation}$, in the same manner as described above with respect to the paver controller 138. Additional steps may be performed in this alternative embodiment, such as those described above, with respect to the various alternative embodiments.

Still further, although one of the paver controller 114 and the compactor controller 138 is described as performing certain steps of the method 500 in the embodiments described above, in still another alternative embodiment, a controller that is remote from the paver 102 and the compactor 134 may be used to perform at least some of steps of the method 500. For example, in an alternative embodiment, the remote controller may obtain the thermal image data 118 and the paver coordinate PD(x,y) from the paver controller 114. Then, the remote controller may determine whether the person 170 is on the asphalt mat 126 by analyzing the received thermal image data 118 using a processor to perform the functions described above. If a person is identified as being present on the asphalt mat 126 between the paver 102 and the compactor 134, the remote controller may automatically slow or stop the compactor 134, in the same manner as described in the alternative embodiments above. In addition, upon determining that the person 170 is on the asphalt mat 126, the remote controller may calculate a compactor-to-person distance $X_{C-P}$ and may perform automatic control of the compactor 134 using the maintain speed threshold distance $X_{maintain\_speed}$ and the maintain operation threshold distance $X_{maintain\_operation}$, in the same manner as described above with respect to the paver controller 138. Additional steps may be performed in this alternative embodiment, such as those described above.

Although specific temperature thresholds are described above, the threshold temperatures are not limited to these values, and may be subject to change. For example, the threshold temperatures may be determined by the paver controller 114 using ambient temperature. In addition, although specific maintain speed threshold distance $X_{maintain\_speed}$ and a specific maintain operation threshold distance $X_{maintain\_operation}$ are described above, the threshold distances are not limited to these values and may be subject to change. Further, in an embodiment in which one of the paver controller 114, the compactor controller 138, or the remote controller determines a compactor-to-person distance $X_{C-P}$, the method may include determining a paving-device-to-compactor distance $X_{PD-C}$, which may be calculated based on the received GPS data 130, or which may be a predetermined threshold distance that is used to control the paving operation.

The positions of the paver 102, the compactor 134, and the person 170 as used in the method 500 may be near real-time positions. That is, the paver controller 114, the compactor controller 134, or the remote controller, in performing the steps of the method, may use The method 500 may be performed every time a scan line 124 is obtained by the paver controller 114. Alternatively, the method 500 may be performed less frequently. For example, the method 500 may be performed after a number of scan lines 124 are obtained by the paver controller 114.

In addition, the method 500 of the present disclosure may be used as a feature of an autonomous or semi-autonomous paving operation of the paving system 100. That is, the method 500 may be used in a fully-automated paving operation that does not require inputs or actions by one or more operators. Alternatively, the method 500 may be used in a semi-autonomous paving operation, in which a paving operation may require inputs or actions by one or more operators.

The embodiments of the present disclosure encompass a system for controlling an operation of a compactor during a paving operation using thermal image data and position data of an asphalt mat, and at least a threshold temperature. In addition, the embodiments of the present disclosure encompass a method of controlling a compactor during a paving operation using thermal image data and position data of an asphalt mat, a threshold temperature, and one or more threshold distances. Further, the embodiments of the present disclosure encompass a method of reducing a speed of a compactor during a paving operation upon detection of a person on an asphalt mat, using at least thermal image data and position data of an asphalt mat, and a threshold temperature.

By virtue of the system and the related method of the present disclosure, a mechanism is provided by which a person can be detected in near real-time on an asphalt mat using thermal image data, which may not necessarily require additional equipment or devices, and machines in a paving system 100 may be controlled based on such detection. That is, the thermal measuring device 112 used to obtain the thermal image data may be provided on paving machines to control movement of machines of the paving system 100, and to assess a quality of the asphalt mat. Therefore, the system and the related methods of the present disclosure may use the same thermal image data obtained by the thermal measuring device 112, without the need for a separate device.

Further, with respect to at least some embodiments described above, by virtue of the system and the related method of the present disclosure, interruptions of a paving operation may be reduced by limiting generation of the reduce speed signal to those instances in which the person 170 is close to the compactor 134, i.e., within the maintain speed threshold distance $X_{maintain\_speed}$ and/or within the maintain operation threshold distance $X_{maintain\_operation}$.

It will be apparent to those skilled in the art that various modifications and variations can be made to the disclosed system and method without departing from the scope of the disclosure. Other embodiments of the system and the method will be apparent to those skilled in the art from consideration of the specification and practice of the paving operation control system and method disclosed herein. It is intended that the specification and examples be considered as exemplary only, with a true scope of the disclosure being indicated by the following claims and their equivalents.

What is claimed is:

1. A method of controlling an operation of a compactor during a paving operation, the method comprising:
   obtaining thermal image data and position data of an asphalt mat using a measuring device on a paving machine;
   determining, using a controller, whether a person is on the asphalt mat based on a temperature range and the thermal image data;
   determining, using the controller, a distance between the person and the compactor using the obtained position data and a position of the compactor; and
   generating, using the controller, a signal for reducing a speed of the compactor when the determined distance between the person and the compactor is less than a maintain speed threshold distance.

2. The method of claim 1, wherein the controller is associated with at least one of a paving machine and the compactor.

3. The method of claim 1, wherein the thermal image data and the position data are obtained in near real-time.

4. The method of claim 1, wherein the determining whether the person is on the asphalt mat includes identifying one or more points, of a plurality of points in the thermal image data, for which a temperature value is within the temperature range.

5. The method of claim 4, wherein the determining the distance between the person and the compactor includes calculating a distance between a position value of at least one of the identified one or more points and a position value of the compactor.

6. The method of claim 5, further comprising generating a notification, for display on a display of the compactor, indicating that the person is identified on the asphalt mat when the distance between the person and the compactor is less than the maintain speed threshold distance.

7. The method of claim 5, wherein the generating the signal for reducing the speed of the compactor includes generating a signal for stopping the compactor when the determined distance between the person and the compactor is less than a maintain operation threshold distance, the maintain operation threshold distance being less than the maintain speed threshold distance.

8. The method of claim 7, further comprising generating a notification, for display on a display of the compactor, indicating that operation the compactor is being automatically stopped because the person is identified on the asphalt mat when the distance between the person and the compactor is less than the maintain operation threshold distance.

9. The method of claim 1, wherein the temperature range is defined by a low threshold temperature of 80° F. and a high threshold temperature of 105° F.

10. A system for controlling a paving operation, the system comprising:
    a paving machine including:
       a measuring device configured to obtain thermal image data and position data of an asphalt mat; and
       a paving machine controller configured to determine whether a person is on the asphalt mat based on a temperature range and the thermal image data; and
    a compactor including a compactor controller in communication with the paving machine controller,
    wherein the paving machine controller is further configured to determine, when the paving machine controller determines that a person is on the asphalt mat, a distance between the person and the compactor based on the obtained position data, and to generate and output a signal for reducing a speed of the compactor when the determined distance between the person and the compactor is less than a maintain speed threshold distance, and the compactor controller is configured to automatically reduce the speed of the compactor upon receiving the signal to reduce the speed of the compactor.

11. The system of claim 10, wherein the paving machine controller and the compactor controller are in wireless communication with each other.

12. The system of claim 10, wherein the thermal image data and the position data are obtained in near real-time.

13. The system of claim 10, wherein the paving machine controller, in determining whether the person is on the asphalt mat, identifies one or more points, of a plurality of points in the thermal image data, for which a temperature value is within the temperature range.

14. The system of claim 13, wherein the paving machine controller, in determining the distance between the person and the compactor, calculates a distance between a position value of at least one of the identified one or more points and a position value of the compactor.

15. The system of claim 14, wherein the compactor further includes a display, and the compactor controller is further configured to display a notification, on the display, indicating that the person is identified on the asphalt mat, when the distance between the person and the compactor is less than the maintain speed threshold distance.

16. The system of claim 14, wherein the paving machine controller is further configured to generate and output a signal for stopping operation of the compactor when the determined distance between the person and the compactor is less than a maintain operation threshold distance, which is less than the maintain speed threshold distance, and the compactor controller is configured to automatically stop operation of the compactor upon receiving the signal to stop operation of the compactor.

17. The system of claim 16, wherein the compactor further includes a display, and the compactor controller is further configured to display a notification, on the display, indicating that operation of the compactor is being automatically stopped because the person is identified on the asphalt mat, when the distance between the person and the compactor is less than the maintain operation threshold distance.

18. The system of claim 10, wherein the temperature range is defined by a low threshold temperature of 80° F. and a high threshold temperature of 105° F.

19. A method of automatically reducing a speed of a compactor during a paving operation upon detection of a person on an asphalt mat, the method comprising:
    receiving, from a measuring device on a paving machine, near real-time temperature data and near real-time position data for a plurality of points of an asphalt mat;
    determining, using a controller on the paving machine, points, of the plurality of points, for which a temperature value is within a temperature range as person-identifier-points, based on the received near real-time temperature data; and
    generating a signal, upon determining the person-identifier-points, to reduce the speed of the compactor.

20. The method of claim 19, further comprising determining, using the controller on the paving machine, a distance between the person-identifier-points and a position of the compactor,
 wherein the generating of the signal to reduce the speed of the compactor is based on the determined distance between the person-identifier-points and the position of the compactor.

\* \* \* \* \*